United States Patent [19]
Streeter

[11] 3,741,511
[45] June 26, 1973

[54] SEAT TILTING STRUCTURE
[76] Inventor: Glen E. Streeter, N. Ardinger Street, Hamilton, Mo.
[22] Filed: June 1, 1971
[21] Appl. No.: 148,325

[52] U.S. Cl. .................. 248/371, 248/376, 248/399
[51] Int. Cl. ............................................. B60n 1/02
[58] Field of Search ................... 248/371, 372, 376, 248/377, 382, 384, 397, 398, 399, 374, 378; 297/314, 315

[56] References Cited
UNITED STATES PATENTS
| 357,059 | 2/1887 | Banks | 297/314 |
| 2,715,938 | 8/1955 | Miller | 248/377 |
| 3,006,593 | 10/1961 | Plate | 248/399 |
| 3,315,934 | 4/1967 | Taylor | 248/382 |

FOREIGN PATENTS OR APPLICATIONS
| 803,930 | 4/1951 | Germany | 248/371 |
| 166,109 | 12/1933 | Switzerland | 297/314 |

Primary Examiner—Edward C. Allen
Attorney—Fishburn, Gold and Litman

[57] ABSTRACT

A seat tilting structure for movable vehicles and more particularly tractors, graders, earth working equipment, and the like, to permit a driver or operator thereof to remain in a substantially vertical position when the vehicle is in a non-level position includes a generally upstanding support standard having one end of a first portion of a tilting arm mounted thereon and extending outwardly therefrom and rotatably supporting a second portion of the tilting arm thereon which has a seat support member mounted thereon whereby a seat supported on the seat support member may be selectively adjusted to a level position when the vehicle is in a non-level position.

2 Claims, 7 Drawing Figures

PATENTED JUN 26 1973

INVENTOR.
Glen E. Streeter

BY
Fishburn, Gold & Litman

ATTORNEYS

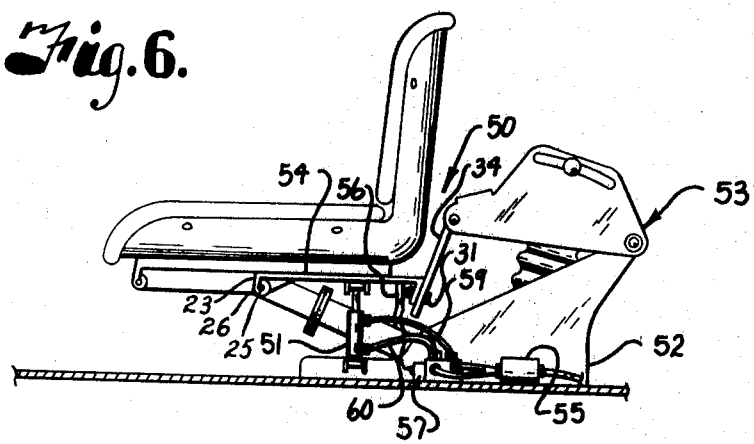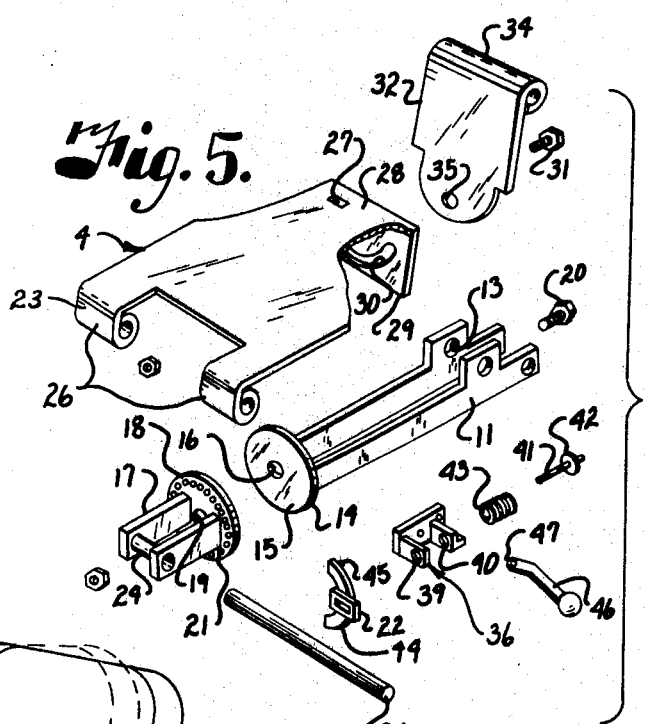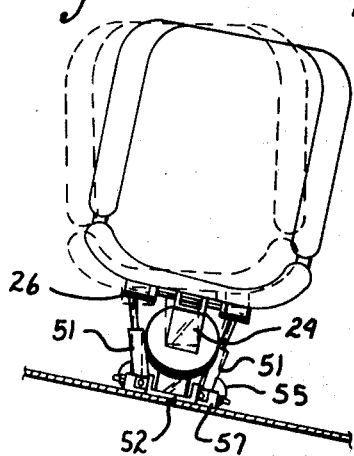

SEAT TILTING STRUCTURE

The present invention relates to seat support structures and more particularly to a seat support structure adjustable to a substantially level position when the vehicle is in a non-level position.

Operators or drivers of tractors, graders, earth working equipment, and the like are known to experience severe pains in their backs, particularly when the respective machine operates for substantial periods of time in a non-level position. It has been found that by providing a seat support structure permitting a seat thereon to remain in a substantially level position when the vehicle is in a non-level position, strain on the back muscles and spine of the operator or driver is substantially reduced thereby eliminating or minimizing back pains and general fatigue.

The principal objects of the present invention are: to provide a seat tilting structure wherein a seat is adjustable to a substantially level position when the vehicle is in a non-level position and which is particularly adaptable for use on earth working equipment including agricultural implements, construction equipment, and the like; to provide such a seat tilting structure for holding the driver's or operator's support or seat in a generally horizontal position thereby providing for the driver's or operator's comfort and safety irrespective of changes in the position of the movable vehicle on which the operator's seat is mounted; to provide such a seat tilting structure having portions thereof tiltable laterally of a respective vehicle to permit changing of the position of the seat or support relative to the vehicle so that when the respective vehicle is operated in a tilted position, as in plowing, grading, or like operations having one side of a vehicle lower than the other wherein the seat or support is moved into or held in a substantially horizontal position; to provide such a seat tilting structure wherein adjustment of the position of the seat is substantially automatic and in response to movement of the seat from a substantially level position to return and maintain the seat in a level position; and to provide such a seat tilting structure which is versatile in use, durable in construction, economical to manufacture, simple and direct in operation, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include exemplary embodiments illustrating the various objects and features of the seat tilting structure of the present invention.

FIG. 5 is an exploded perspective view of the tilting arm, seat support member, and means for selectively tilting the seat support member and the seat thereon.

FIG. 6 is a side elevational view of a modified form of the seat tilting structure and having automatic seat tilting means.

FIG. 7 is a front elevational view of the modified seat tilting structure and showing a seat and support therefor in an adjusted position in broken lines.

Figure 1:
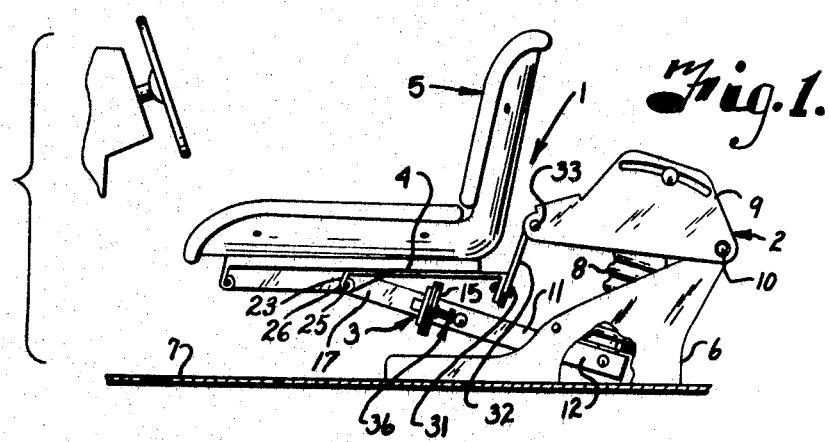
FIG. 1 is a side elevational view of a seat tilting structure embodying features of the present invention.
Figure 2:
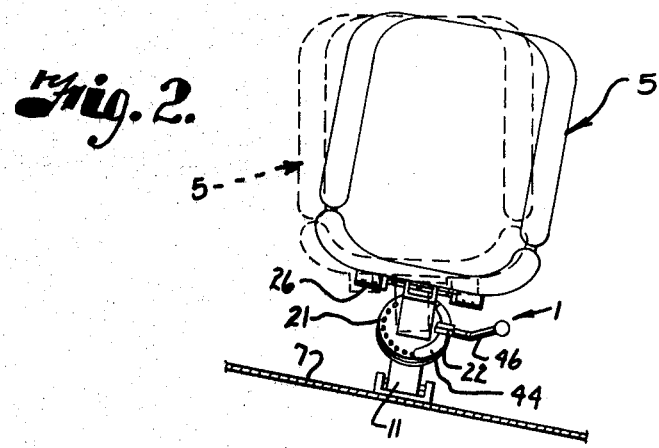
FIG. 2 is a front elevational view of the seat tilting structure and showing a seat and support therefor in an adjusted position in broken lines.
Figure 3:
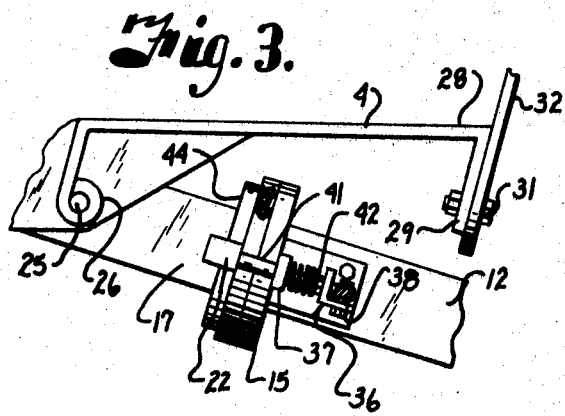
FIG. 3 is an enlarged fragmentary side elevational view of a tilting arm and seat support structure and means for selectively tilting the seat support member and a seat thereon.
Figure 4:
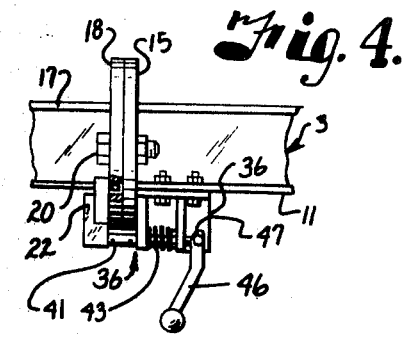
FIG. 4 is an enlarged fragmentary plan view of the means for selectively tilting the seat support member and the seat thereon.

Referring more in detail to the drawings:

As required, detailed embodiments of the invention are disclosed herein, however, it is to be understood that the disclosed embodiments are merly exemplary of the invention which may be embodied in various forms that are different from those illustrative embodiments presented herein. Therefore, specific structural and functional details disclosed herein are not to be interpreted as limiting but merely as a basis for the claims actually defining the scope of this invention. In this regard, it is to be recognized that the apparatus or structure for tilting seats of movable vehicles, in accordance herewith, may be embodied in various forms and, furthermore, that such apparatus or structure may be variously supported, however, the disclosure hereof is presented only as a representative basis for teaching one skilled in the art to variously employ the present invention in virtually any appropriate detailed structure.

Conventional seat supporting structures maintain a seat thereon in a fixed relation with a vehicle during movement of the vehicle particularly during operation in a tilted or non-level position whereby the operator or driver of the vehicle must adjust his position, as by bending the spine, to remain in a substantially vertical position when the vehicle is in a non-level position, such bending particularly for prolonged periods effects severe back pains and fatigue.

In the disclosed embodiment of the present invention, the reference numeral 1 generally designates a seat tilting structure for movable vehicles, such as tractors, graders, earth working equipment, and the like, to permit a seated driver or operator thereof to remain in a substantially vertical position when the vehicle is in a non-level position. A generally upstanding support standard 2 has one end of a first portion of a tilting arm 3 mounted thereon and extending outwardly therefrom and rotatably supporting a second portion of the tilting arm 3 thereon which has a seat support member 4 mounted thereon and which is selectively rotatable relative to the first portion of the tilting arm 3 whereby a seat 5 supported on the seat support member 4 may be adjusted to a level position when the vehicle is in a non-level position.

The support standard 2 may be any suitable structure providing resilient support for the seat 5, however, in the illustrated structure, the support standard 2 includes a base portion 6 suitably secured to a floor 7 of any vehicle adapted to be used in a non-level position. The base portion 6 is illustrated as a pair of spaced and upstanding plates defining a compartment for suitable resilient means, such as springs or an air bag 8, having a lower end thereof pivotally secured to the first portion of the tilting arm 3 and an upper end thereof pivotally secured to an upper portion 9 of the support standard 2. The upper portion 9 is illustrated as pivotally mounted on the base portion 6, as at 10, to thereby increase the comfort and safety of an operator of the respective vehicle.

The tilting arm 3 is illustrated as having a first or fixed portion 11 having one end 12 pivotally mounted on the base portion 6 of the support standard 2, as by a suitable fastening member, such as a bolt, rivet, or the like, extending through suitable apertures 13 in the one end 12, of the first portion 11 of the tilting arm 3. Another or opposite end 14 of the first portion 11 has a flange or end member 15 mounted thereon and having an aperture 16 therethrough to permit rotatably mounting a second or movable portion 17 having the seat support member 4 mounted thereon, as later described.

The illustrated second or movable portion 17 of the tilting arm 3 includes a flange or end member 18 engageable with the flange or end member 15 of the first portion 11 and having an aperture 19 therethrough alignable with the aperture 16 to receive a suitable fastening member, such as a bolt 20, for rotatably supporting the second or movable portion 17 on the end 14 of the first portion 11. The flange or end member 18 of the second or movable portion 17 has a plurality of circumferentially spaced apertures 21 therein to receive a keeper member 22, as later described, for maintaining the movable or second portion 17 in a selected position relative to the first portion 11 of the tilting arm 3.

The seat support member 4 has one end 23 mounted on the second or movable portion 17 whereby rotation of the second or movable portion 17 relative to the first portion 11 of the tilting arm 3 is effective to rotate or tilt the seat 5 relative to the support standard 4. In the illustrated structure, the second or movable portion 17 of the tilting arm 3 has a sleeve member 24 adapted to receive a pin or shaft 25 which also extends through spaced sleeve portions 26 at or adjacent the one end 23 of the seat support member 4 thereby pivotally mounting the seat support member 4 on an outstanding end of the tilting arm 3.

The seat support member 4 is illustrated as an elongated generally planar member having a plurality of spaced slots 27 positioned adjacent an other or opposite end 28 thereof to receive suitable projections extending or depending from the seat 5 to removably support same thereon. The planar seat support member 4 has a depending end portion 29 at the other or opposite end 28 which has an arcuate slot 30 therein to receive a suitable guide member 31 therein, as later described, for permitting tilting of the seat support member 4 relative to the support standard 2.

In the illustrated structure, a planar member 32 is suitably pivotally mounted on and depending from the upper portion 9 of the support standard 2, as by a suitable shaft or pin 33 extending through a sleeve portion 34 of the planar member 32 and having opposite ends thereof suitably supported on the upper portion 9 of the support standard 2. A lower end of the planar member 32 has an aperture 35 therethrough to receive the guide member 31 which extends through the arcuate slot 30 in the depending end portion 29 of the seat support member 4 thereby supporting the other or opposite end 28 thereof and permitting tilting of the seat support member 4 and the seat 5 supported thereon.

In the illustrated structure, tilting of the seat 5 is accomplished manually as by disengaging the keeper member 22 from the apertures 21 in the flange or end member 18 of the second or movable portion 17 of the tilting arm 3 to permit rotation thereof about the bolt 20 and thereby relative to the first portion 11 of the tilting arm 3 and support standard 2. The illustrated tilting means includes a mounting bracket 36 suitably secured on the first portion 11 of the tilting arm 3, as by a plurality of suitable fastening members, such as bolts or screws. The mounting bracket 36 has a pair of spaced arms 37 and 38 extending outwardly therefrom and having aligned apertures 39 and 40 therein respectively to receive a suitable shaft or plunger 41 extending therethrough.

The shaft or plunger 41 has one end thereof connected to the keeper member 22 and means engage the shaft or plunger 41 to urge the keeper member 22 into a position retaining the second or movable portion 17 in a fixed position relative to the first portion 11 of the tilting arm 3. In the illustrated structure, an abutment or keeper member 42 is mounted on the shaft 41 intermediate the ends thereof and positioned between the arms 37 and 38 to be engaged by a suitable resilient member 43 sleeved on the shaft or plunger 41 and engaging one of the arms, for example arm 37 adjacent the keeper member 22, for urging same into engagement with the flange or end member 18 and urging the other end of the shaft or plunger 41 outwardly through the aperture 40 in the other arm 38 of the mounting bracket 36.

The keeper member 22 is illustrated as a generally arcuate plate 44 having a plurality of circumferentially spaced projections 45 extending therefrom and engageable within selected apertures 21 in the flange or end member 18 of the second or movable portion 17 to thereby prevent rotation of the second or movable portion 17 relative to the first portion 11 of the tilting arm 3.

Disengagement of the projections 45 from the apertures 21 permits rotation of the second or movable portion 17 thereby tilting of the seat 5 and in the illustrated structure, a lever or handle 46 has one end pivotally mounted on the arm 38 and engageable with the free end of the shaft or plunger 41, as by a suitable cam surface 47, whereby movement of the lever or handle 46 is effective to overcome the resistance of the resilient member 43 and move the keeper member 22 and the projections 45 extending therefrom to effect disengagement from the apertures 21 thereby permitting rotation of the second or movable portion 17 as desired by a driver or operator of a vehicle having the tilting structure 1 mounted thereon.

In using a seat tilting structure, constructed as illustrated and described, the seat support member 4 may be adjusted prior to the vehicle assuming a non-level position or after the vehicle is in a working position. Adjustment is effected by moving the lever or handle 46 to disengage the keeper member 22 from the flange or end member 18 of the second or movable portion 17 of the tilting arm 3 to permit selective rotation of the seat support member 4 to a horizontal or substantially level position. The lever or handle 46 is then released to permit the resilient member 43 to seat the projections 45 in the selected apertures 21 thereby maintaining the seat support member 4 and the seat 5 thereon in the selected position relative to the support standard 2. The guide member 31 supports the other or opposite end 28 of the seat support member 4 during the adjustment thereof by extending through the arcuate slot 30 in the depending end portion 29.

FIGS. 6 and 7 illustrate a modified seat tilting structure wherein the tilting means includes extensible power means in the form of one or more extensible members, such as hydraulic cylinders 51, extending between and having respective opposite ends thereof connected to a base portion 52 of an upstanding support standard 53 and to a seat support member 54.

The hydraulic cylinder or cylinders 51 are operatively connected to a suitable source of hydraulic fluid, such as a hydraulic system of the respective tractor, grader, earth working equipment, and the like and in the illustrated structure, a suitable pressure control valve 55 is positioned between the source of hydraulic fluid and the hydraulic cylinder or cylinders 51 to adjust the pressure to a value suitable for the hydraulic cylinder or cylinders 51.

It is desirable that extension and retraction of the hydraulic cylinder or cylinders 51 be automatic and in response to movement of the seat support member 54 relative to a substantially level position to thereby activate the extensible hydraulic cylinders 51 to return the seat support member 54 to the level position. In the illustrated embodiment, a suitable movement sensitive member, such as a gravity operated mercury switch 56, is mounted on the seat support member 54 and is operatively connected to a suitable solenoid valve 57 to activate a flow control valve 58 for effecting flow of hydraulic fluid to respective opposite ends of the hydraulic cylinder or cylinders 51, as through suitable flow members 59 and 60 communicating with respective opposite ends thereof.

Remaining components of the modified seat tilting structure are substantially similar to those of the seat tilting structure 1, except for the means for manually tilting the seat 5 and retaining same in a tilted or adjusted position and operation of the modified seat tilting structure 50 is automatic and substantially instantanious to maintain the seat support member 54 and a seat thereon in a substantially level or horizontal position even during changes in the tilt or inclination of the respective vehicle having the modified seat tilting structure 50 mounted thereon.

It is to be understood that while I have illustrated and described certain forms of my invention it is not to be limited to these specific forms or arrangement of parts herein described and shown.

What I claim and desire to secure by Letters Patent is:

1. A seat tilting structure comprising:
   a. a base portion for mounting on a movable vehicle below and rearwardly of a steering wheel and having laterally spaced upstanding standards;
   b. an upper portion having an end pivotally mounted on upper portions of said standards for rotation about a first transverse axis, said upper portion extending forwardly from said standards;
   c. a tilting arm having one portion with an end thereof pivotally mounted on said base portion below said upper portion for rotation about a second transverse axis, said one portion of said tilting arm extending forwardly from said base portion and terminating in a forward end, said tilting arm having a second portion with a rear end thereof, said second portion extending forwardly and terminating in a seat support end, said tilting arm having a third portion extending rearwardly of said second transverse axis;
   d. means rotatably connecting said second portion to the one portion of said tilting arm for rotation about a longitudinal axis;
   e. a spring biased load support member having one end connected to said upper portion forwardly of said first transverse axis and an other end connected to said third portion of the tilting arm and oppositely in rearwardly spaced relation from said second transverse axis;
   f. a seat;
   g. means pivotally connected with the seat support end of the second portion of said tilting arm and a forward portion of the seat respectively
   h. a seat support member for engagement by a rear portion of said seat, said seat support member having one member with an end thereof pivotally connected to the seat support end of the second portion of said tilting arm and a second member having an end thereof pivotally connected to the upper portion and forwardly of the load support member with said second member depending from said upper portion;
   i. means rotatably connecting said one member and said second member of said seat support member for rotation about a longitudinal axis whereby the seat, one member of said seat supportmember, and the second portion of said tilting arm rotate relative to said base portion, upper portion, one portion of said tilting arm, and second member of said seat support member and in all positions said seat is swingable upwardly and rearwardly to a position above said seat support member; and
   j. means extending between said base portion and said seat support member and operative to effect said relative rotation, said means operative to effect said relative including:
      1. movement sensitive means mounted on said one member of said seat support member;
      2. flow control valve means operatively connected to a source of fluid under pressure and responsive to said movement sensitive means;
      3. extensible means extending between and having respective opposite ends thereof pivotally connected to said base portion and to said one member of said seat support member and operatively connected to said flow control valve means for flow of fluid therebetween in response to movement of said movement sensitive means to an out of level position.

2. A seat tilting structure for movable vehicles and comprising:
   a. a generally upstanding support standard mounted on a movable vehicle, said support standard having a base portion mounted on the movable vehicle and an upper portion pivotally mounted on said base portion;
   b. a tilting arm pivotally mounted on said base portion of said support standard and extending outwardly therefrom, said tilting arm having a first portion with one end thereof pivotally mounted on said base portion of said standard and a second portion rotatably mounted on an other end of said first portion of said tilting arm;
   c. resilient means having one end pivotally mounted on said first portion of said tilting arm and an other end thereof pivotally mounted on said upper portion of said support standard for resiliently biasing said upper portion;

d. a seat support member having one end pivotally mounted on the second portion of said tilting arm and positioned above said tilting arm;
e. a planar member pivotally mounted on said upper portion of said support standard;
f. cooperating means on the other end of said seat support member and on said planar member for permitting tilting of said seat support member relative to said planar member;
g. a seat engaging and supported on said seat support member;
h. means extending between said base portion of said standard and said seat support member for selectively tilting said seat support member and said seat thereon relative to said planar member and in response to movement of said seat support member from a substantially level position to return said seat support member to the level position, said means for selectively tilting said seat support member including:
1. movement sensitive means mounted on said seat support member;
2. a solenoid valve operatively connected to said movement sensitive means;
3. flow control valve means operatively connected to a source of fluid under pressure and to said solenoid valve; and
4. extensible means extending between and having respective opposite ends thereof pivotally connected to said base portion of said support standard and to said seat support member and operatively connected to said flow control valve means for receiving fluid therefrom in response to movement of said movement sensitive means to an out of level position.

* * * * *